United States Patent [19]

DeMarco

[11] Patent Number: 5,180,407
[45] Date of Patent: Jan. 19, 1993

[54] VACUUM LOADER WITH VANED AND SHORT TANGENTIAL SEPARATOR

[76] Inventor: Thomas M. DeMarco, 5815 N. Cicero, Chicago, Ill. 60646

[21] Appl. No.: 792,297

[22] Filed: Nov. 14, 1991

[51] Int. Cl.⁵ .......................................... B01D 46/04
[52] U.S. Cl. ............................... 55/302; 55/337; 55/345; 55/398; 55/459.1
[58] Field of Search ............ 55/302, 337, 345, 398, 55/440, 453, 455, 456, 457, 459.1

[56] References Cited

U.S. PATENT DOCUMENTS

| | | | |
|---|---|---|---|
| 1,591,147 | 7/1926 | Wales | 55/455 X |
| 2,182,862 | 12/1939 | Allardice | 55/459.1 X |
| 2,432,757 | 12/1947 | Weniger | 55/398 X |
| 4,790,865 | 12/1988 | DeMarco | 55/337 |
| 4,820,315 | 4/1989 | DeMarco | 55/337 X |
| 4,869,737 | 9/1989 | Parenti | 55/337 X |

*Primary Examiner*—Charles Hart
*Attorney, Agent, or Firm*—Jeffrey M. Morris

[57] ABSTRACT

A unique vacuum loader with a special tangential separator is provided to efficiently remove, readily collect, effectively separate, and safely dispose of wet, dry, and fibrous materials, including liquids and slurries, in a mine or in other places. Desirably, the tangential separator is compact for use in mines and has special directional vanes which vary the flow and enhance separation of dusty fluid carrying the fibrous material, dust, and other particulate matter.

23 Claims, 4 Drawing Sheets

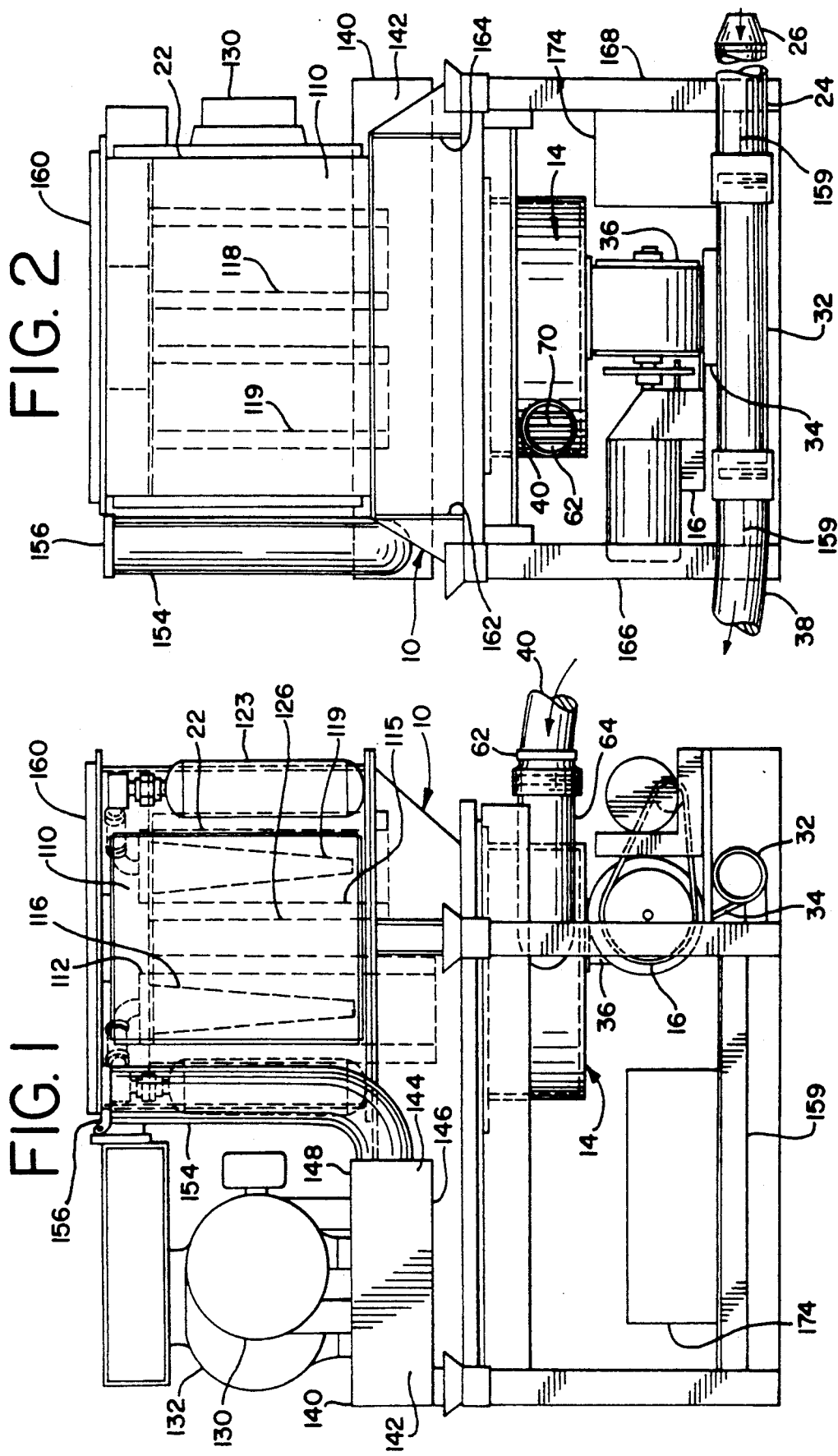

VACUUM LOADER WITH VANED AND SHORT TANGENTIAL SEPARATOR

BACKGROUND OF THE INVENTION

This invention pertains to machines for removing dry and wet liquid particulates, and more particularly, to a vacuum cleaner loader for removing and transporting fibrous solid and liquid matter, and other particulate material.

Government studies and medical papers have linked prolonged exposure by miners to coal dust and other mineral dust to black lung disease. Health reports have also linked exposure to fiberglass fibers with health problems and diseases including fibrosis and lung inflammation. They have also been thought to cause or aggravate other maladies, such as emphysema, tuberculosis, bronchitis, asthma, pneumonia, and infections. Mineral and fiber dust are readily circulated in the air and are dangerous if inhaled. They can also cause dust explosions. The presence and prolonged exposure to dust can be harmful and injurious to the health, safety, and well being of miners and other people.

Particulates of minerals, metals, and fibers can also be carried and circulated in the air and can be injurious, if breathed, swallowed, or stuck in an eye. Particulates of material can also damage, erode, and adversely effect the efficiency and operability of equipment. Dusty material can also pollute the atmosphere.

Tall vacuum cleaners, large industrial dust collectors, high separators and other bulky equipment may not fit and are often not suitable in compact places, such as in many underground mines.

Over the years a variety of vacuum cleaners, industrial dust collectors, separators and other equipment have been suggested for removing dust and debris and for other purposes. Typifying these vacuum cleaners, industrial dust collectors, separators and other equipment are those found in U.S Pat. Nos. 485,915, 795,412, 2,276,805, 2,372,316, 2,467,503, 2,496,180, 2,604,956, 2,720,278, 3,320,727, 3,485,671, 3,541,631, 3,554,520, 3,577,705, 3,608,283, 3,650,420, 3,653,190, 3,717,901, 3,731,464, 3,751,881, 3,780,502, 3,842,461, 3,877,902, 3,951,623, 3,955,236, 3,961,655, 3,970,489, 3,999,653, 4,007,026, 4,010,784, 4,032,424, 4,036,614, 4,062,664, 4,099,937, 4,111,670, 4,174,206, 4,207,937, 4,224,043, 4,229,193, 4,272,254, 4,307,764, 4,443,235, 4,504,292, 4,467,494, 4,723,060, 4,786,299, 4,820,315, and 4,963,172. These prior art vacuum cleaners, industrial dust collectors, separators and other equipment have met with varying degrees of success.

It is, therefore, desirable to provide an improved vacuum loader which overcomes most, if not all, of the preceding problems.

SUMMARY OF THE INVENTION

An improved vacuum loader is provided for long and short distance vacuuming of wet and dry fiberglass, asbestos and other light fibrous material, coal and other minerals, lumps, chunks, soda ash, slurries, metal chips and slivers, powder, dense and heavy material, such as steel shot and talconite pellets, hazardous matter and other dusty particulate material in mines and in other places. The heavy duty industrial vacuum loader and tangential separator are relatively small and compact and are particularly useful in places of limited height or with other space restrictions, such as underground mines, and for preventing dust explosions. Desirably, the improved vacuum loader readily removes, collects, and disposes particulate material. Advantageously, the vacuum loader is efficient, effective and safe.

The novel vacuum loader can have a unique two stage separator system and is equipped with a special tangential separator. The tangential separator can partially dedust and separate a substantial amount of particulate material from dusty fluids, including dust laden air and other gases or dust laden water and other liquids. Significantly, the tangential separator has one or more directional vanes to minimize clogging and substantially enhance separation of the particulates. At least one of the vanes can be positioned in proximity to the inlet or outlet of the tangential separator or be located therebetween.

The preferred tangential separator has: an inlet for ingress of a dusty fluid containing particulate material; outlets including a particulate outlet for egress of separated particulate material and a fluid outlet for egress of partially dedusted fluid; and directional vanes extending between the inlet and outlets to change the direction and direct the flow of the dusty fluid and enhance separation of the particulates. Desirably, the vanes help minimize and prevent clogging, backup and piling up of particulates of dust in the tangential separator.

In the most preferred form, the tangential separator comprises a tangential entry cyclone separator with an annular wall positioned about the outlets and directional vanes. The inlet comprises a tangential intake conduit which extends tangentially from the annular wall. The directional vanes can comprise imperforate and rigid barriers, although in some circumstances it may be desirable that they be flexible, perforated or foraminous. One or more of the barriers can be spaced away from the inlet. Some of the barriers can be spaced apart from the outlets. Preferably the directional vanes has at least one curved vane and some of the vanes can have a beveled end. The directional vanes can include a baffle, preferably a set of arcuate baffles, which connect the inlet and outlets. The directional vanes can also include deflectors with concave and/or convex surfaces. Some of the deflectors can be connected and extend to the outlets.

The vacuum loader can also have: an inlet hose to draw and vacuum fluid laden with particulate under a negative suction pressure; a first stage bulk material receiver-separator; a second stage tangential separator to receive the particulate laden fluid carryover from the first stage bulk material receiver; a reinjection unit with a collection chamber communicating with the inlet hose to receive separated particulate material from the second stage tangential separator; and a third stage filter. The first stage bulk material receiver-separator assembly can comprise: a rotary bulk separator direct belt loader to receive and make a gross cut separation of the particulate material from the fluid, and has bulk material receiver comprising a bin, receiver, or conveyor(s), such as a belt conveyor, to receive, convey or transport the grossly separated particulate material away from the rotary bulk material receiver separator. The second stage separator assembly can include the tangential separator and a third stage filtering unit to filter the partially dedusted fluid from the second stage tangential separator. The vacuum loader can be mounted on a forklift skid or a trailer and can be equipped with a vacuum pump and silencer.

The vacuum loader can have a vacuum power package with a positive displacement vacuum pump driven by an engine or motor. The vacuum pump can pull vacuums, e.g. up to 16 inches mercury (217 inches water).

As used in this Patent Application, the term "dust" means particulate matter, debris and waste. The dust can comprise particulates of fiberglass, asbestos and other fibrous materials, powder, coal and other minerals, metal slivers and chips, sand, soda ash, steel shot, talconite pellets and other particulate material.

The term "fluid" as used herein means air and other gases and water and other liquids.

The terms "dedust" and "dedusted" as used herein mean removing a substantial amount of dust.

The term "fines" as used herein means small, minute, particulates.

The term "bulk" as used herein means the major portion of the vacuumed materials.

A more detailed explanation of the invention is provided in the following description and appended claims taken in conjunction with the accompanying drawings.

BRIEF DESCRIPTION OF THE DRAWINGS

FIG. 1 is a side view of vacuum loader with a tangential separator in accordance with principles of the present invention;

FIG. 2 is an end view of the vacuum loader with a tangential separator;

DETAILED DESCRIPTION OF THE PREFERRED EMBODIMENT

Figure 3:
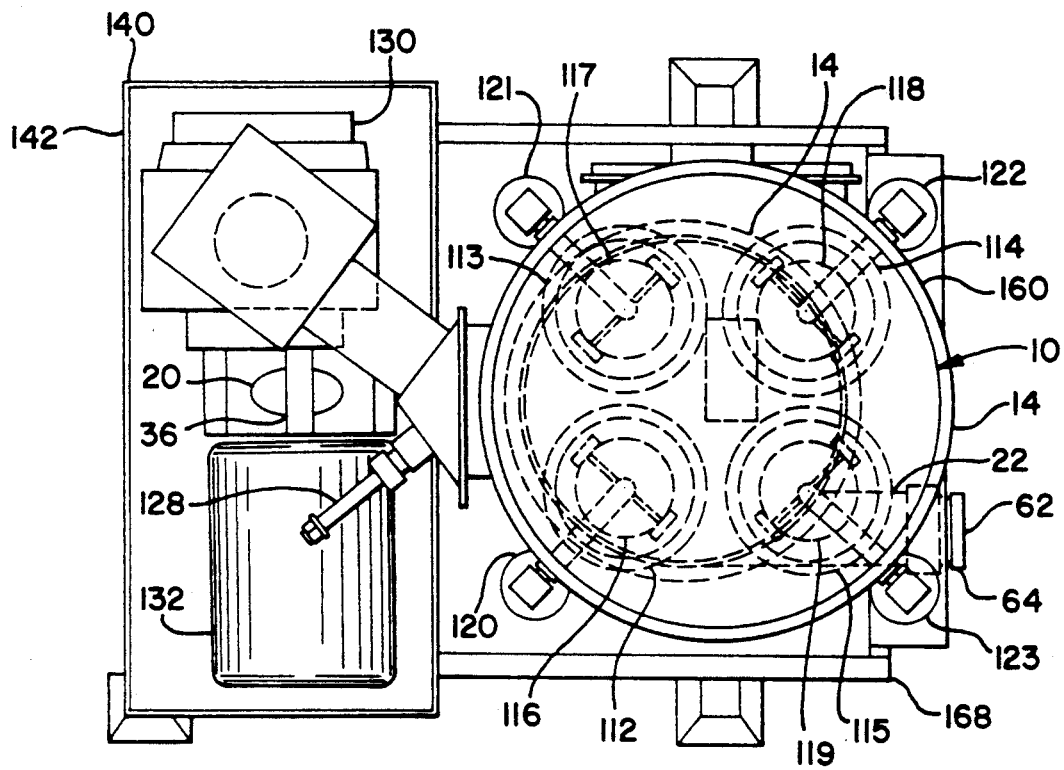
FIG. 3 is a top view of the vacuum loader with a tangential separator.

A three stage separator system, portable vacuum loader 10 (FIGS. 1-3 and 8) provides a heavy duty vacuum operated machine and industrial dust and waste material collector-separator with a first stage direct separation unit 12 (FIG. 8), a second stage tangential separation unit 14 (FIGS. 1-3) and a third stage filter unit 22. The vacuum loader 10 efficiently and effectively removes, compactly contains, and safely separates from the air stream particulates consisting primarily of dusty particulate material comprising dry, wet, or fluid entrained, flowable matter, such as fibers, slivers, chips, granular material, fibrous material, pellets, chunks, powders, slurries, liquids, debris, coal and other minerals, soda ash, dense and heavy material, such as steel shot and talconite pellets, hazardous material, waste and other dusty particulate material in mines and in other places. The heavy duty industrial vacuum loader is particularly useful in compact places, such as underground mines.

The three stage separator system, vacuum loader 10 has a second stage separator unit 14 with a reinjection airlock unit 16 and a third stage filtering system 22.

The vacuum loader 10 has a flexible inlet vacuuming hose 24 (FIG. 2) with a bulk vacuuming nozzle 26 to vacuum an influent fluid containing particulate material, such as from a material spill pile in a mine, under substantially continuous negative pressure. A reinjection unit 16 has a reinjection tee 32 with a reinjection transition 34 (FIG. 1) which provides a receiving transition to receive influent dusty fluid carryover from the tangential separator 14. The reinjection unit 16 has an upright airlock feeder 36 which extends upwardly from the reinjection transition 34 and communicates with the tangential separator 14 to feed separated material from the tangential separator 14 downwardly into the reinjection transition tee. A flexible vacuuming hose 38 (FIG. 2) discharges the dusty fluid and particulate material from the reinjection tee to the inlet connection port 39 (FIG. 8) of the bulk separator 12.

The gross cut rotary bulk separator 12 (FIG. 8) grossly separates the particulate material from the fluid deposit onto a bulk material receiver 18, such as a belt conveyor, bin, or receiver which is positioned below the gross cut rotary bulk separator 12 to receive, convey or transport the particulate laden stream from the gross cut rotary bulk separator 12 to a collection and processing site in the mine. A bulk separator-fluid-outlet hose 40, also referred to as a bulk separation discharge hose and a tangential separator-inlet hose, is connected to and communicates with the outlet port 42 of the gross cut rotary bulk separator 12 and the inlet port 62 (FIG. 2) of the tangential separator 14 to pass the grossly separated fluid stream from the gross cut rotary separator 12 to the tangential separator 14.

The gross cut rotary bulk separator 12 (FIG. 8) has a bulk separation chamber. The bulk separator 12 also has a fluid outlet port 42 which communicates with the bulk separator-fluid-outlet hose 40 to exit the grossly separated fluid stream into the tangential separator 14. The gross cut bulk separator 12 further has a downwardly facing bulk material outlet to discharge the particulate laden stream onto the bulk material receiver 18 comprising a belt conveyor, bin or a receiver.

Figure 4:
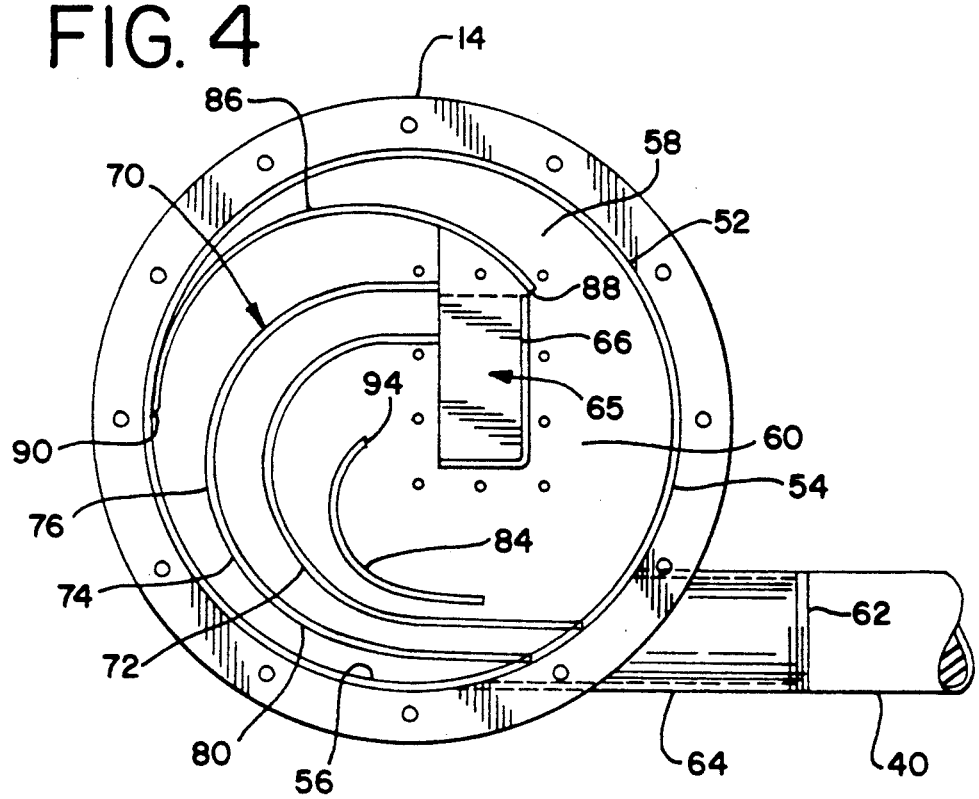
FIG. 4 is a top view of the tangential separator.
Figure 5:
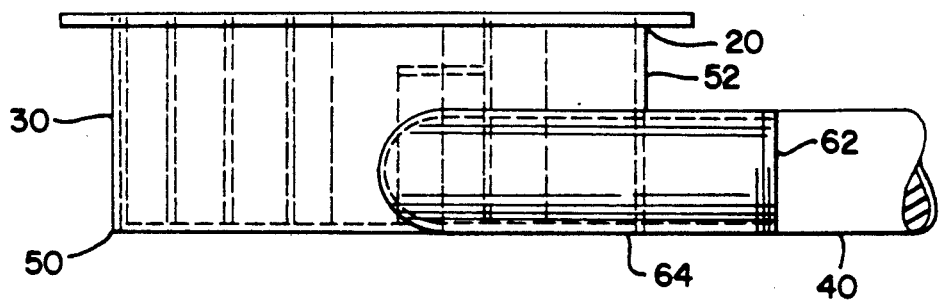
FIG. 5 is a side view of the tangential separator.
Figure 6:
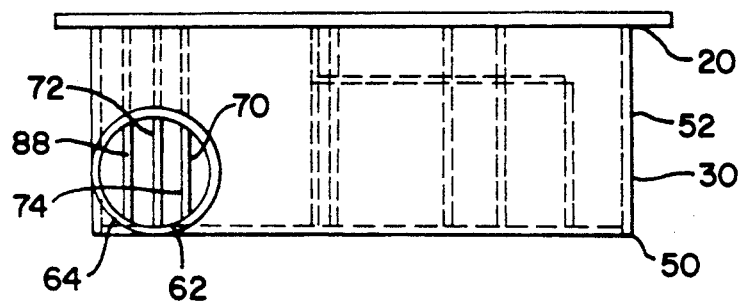
FIG. 6 is a front view of the tangential separator.
Figure 7:
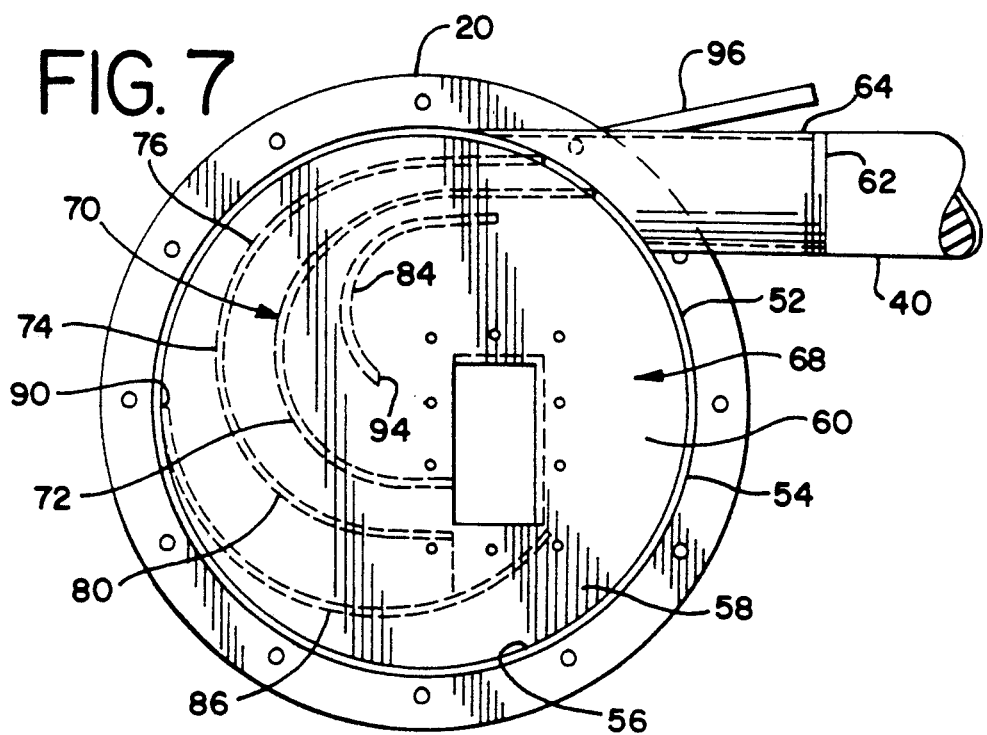
FIG. 7 is a bottom view of the tangential separator.

The tangential separator 14 preferably comprises a tangential entry centrifugal cyclone to partially dedust and separatee the carry over dust from the grossly separated fluid stream. As best shown in FIGS. 4 and 7, the tangential entry cyclone 14 having a cyclone housing 52 with an annular wall with a circular exterior surface 54 and a circular inner surface 56 surrounding a cyclone interior 58 with a central cyclone portion 60. A cyclone inlet 62 is connected to and communicates with the bulk separator-fluid-outlet hose 40 to receive the grossly separated fluid stream and carryover dust from the bulk separator-fluid-inlet hose 40. The cyclone inlet 62 preferably comprises a tangential intake conduit 64 which extends linearly and outwardly from the circular surface of the annular wall of the cyclone housing 52 and communicates with the cyclone interior 58.

Cyclone outlet openings in the central cyclone portion 60 include a lower particulate cyclone outlet 66 (FIG. 4) and an upper fluid cyclone outlet port 68 (FIG. 7). The lower particulate cyclone outlet 66 (FIG. 4) has a downwardly facing cyclone outlet port to discharge the separated carry over dust (particulate material) downwardly from the tangential entry cyclone 14 into the airlock feeder 36 (FIGS. 1 and 2). The upper fluid cyclone outlet port 68 (FIG. 7) passes and exits the partially dedusted fluid upwardly from the tangential entry cyclone 14 into the filtering unit 22 (FIGS. 1 and 2) above. The cyclone outlet openings are covered by a top closure plate 65 (FIG. 4).

Advantageously, the tangential entry cyclone separator 14 (FIGS. 4-7) has a set of directional vanes 70 which extend between the cyclone inlet 62 and the cyclone outlet openings 66 and 68 to change and vary the direction of flow of the fluid stream and enhance separation of the dusty particulates from the fluid. Advantageously, the directional vanes 70 help minimize and prevent clogging, backup and piling up of particulates in the tangential separator 14. The directional vanes 70 include a pair of central vanes 72 and 74 with parallel portions 76. The central vanes 72 and 74 are connected to and communicate with the cyclone outlet openings 66 and 68. In the preferred embodiment, the directional vanes 70 have curved portions 80. Desirably, the directional vanes include an arcuate baffle 84 comprising a convex barrier which is spaced from the cyclone inlet 62 and the outlet openings 66 and 68. The convex barrier 84 is positioned inwardly of the central vanes 72 and 74. The illustrated directional vanes 70 also include a concave deflector 86 which is spaced outwardly of the central vanes 72 and 74. The concave deflector 86 has an outlet end 88 connected to the outlet openings 66 and 68 and an inlet end 90 which is connected to the inner surface 56 of the annular wall 52 of the cyclone housing 50. The vanes 70 can also have beveled or inclined ends 94 to enhance particle separation.

The airlock feeder 36 (FIG. 2) extends downwardly from and communicates with the tangential entry cyclone 14 for particulate material to be removed from the tangential entry cyclone 14 into the reinjection tee 32. The reinjection airlock feeder and feed system 36 can have dual valves, a rotary air lock valve, a pinch type air lock valve, or any other air lock feed valve system.

A filtering unit 22 (FIGS. 1 and 2) is positioned above and communicates with the tangential entry cyclone 14. The filtering unit 22 has a filtration chamber 110 with a set of canisters 112–115 (FIG. 3) containing tubular filters 116–119 which are spaced along side each other to filter the partially dedusted fluid. The tubular filters 116–119 can surround a central cartridge filter 126 (FIG. 1). The filtering unit 22 preferably includes a series or set of injectors 120–123 (FIG. 3) to periodically inject intermittent blasts of air upon the tubular filters 116–119 to help clean the tubular filters 116–119 In some circumstances, it may be desirable to use more or less filters, different types of filters, additional filters, such as Hepa-type filters, or other types of filter cleaning equipment, such as mechanical shakers and vibrators. Furthermore, if desired, the filtering compartment can also have ports, slots, tubes, or nozzles for passing, conveying, and injecting the partially dedusted fluid containing fines and smaller particulates into the filter compartment.

A vacuum pump 130 (FIG. 2) communicates with the filtering unit 22 and the hoses 24, 38, and 40 to draw fluid through the filtering unit and the hoses under suction and negative pressure. The vacuum pump 130 can comprise a compressor, pneumatic pump, air blow, fan, or turbine. The preferred vacuum loader also has a vacuum relief valve 128 (FIG. 3) and a drive motor package 132.

The vacuum loader 10 is preferably equipped with a muffler assembly 140 (FIG. 1), most preferably a silencer base muffler assembly, to provide a sound abatement control unit in the mine to muffle, quiet, and abate the noise and sound level of the purified clean filtered fluid exiting the filtering unit 22 as well as to help suppress operational noises from the vacuum pump 130. The muffled purified air can exit through a vent pipe 154 and vent flap 156 to the atmosphere. The muffler assembly 140 preferably has a silencer base 142 with a composite sound attenuating chamber 144 and a box-like muffler rectangular support housing 146 positioned in proximity to and along the side of the filtering unit 22 and the vacuum pump 130. The muffler support housing 146 has an upper flat or planar support surface 148 comprising a top plate and ceiling of the silencer base to support and dampen the vibrations of the vacuum pump 130. The internal composite sound attenuating chamber 144 has an internal, reverse direction, zigzag channel which communicates with the filtering unit to vary the direction of flow of the filtered fluid in a zigzag, sinusoidal, or square wave flow pattern. Acoustical metal, wooden, or plastic muffler baffles in the channels are covered with sound insulating material, such as acoustical sound absorption foam, mineral wool, or fiberglass insulation, to dampen and decrease the noise of the filtered fluid passing through the channel to safe and comfortable levels before it is discharged from the vacuum loader 10 through an exhaust pipe 154. The acoustical baffles include upward composite muffler baffles and downward composite muffler baffles. The upward muffler baffles of the muffler assembly are cantilevered to and extend upwardly from the floor of the muffler housing to a position spaced below the ceiling of the muffler housing. The downward baffles of the muffler assembly are cantilevered and extend downwardly from the ceiling of the housing to a position spaced above the housing floor. The upward baffles are positioned and spaced between the downward baffles. The composite downward and upward baffles provide gas impervious, air impermeable, lateral barriers which extend laterally across and connect the sides of the muffler housing to block and deflect the longitudinal flow of filtered, dedusted, purified clean fluid and concurrently direct the clean fluid in the reverse direction channel so as to reduce the noise of the filtered, dedusted, purified clean fluid passing through the sound attenuating chamber.

The second stage separation and filtration unit has a tangential entry cyclone separator 14 (FIGS. 1 and 2) which is spaced laterally and externally of the rotary bulk separator 12 (FIG. 8) of the first stage bulk separation unit. The tangential cyclone separator 14 dedusts, separates, and removes a substantial amount of particulates from the effluent partially dedusted fluid from the rotary bulk separator 12 of the first stage bulk separation unit.

The vacuum loader 10 can also have a control panel, which when energized and activated, provides voltage and power for the operation of a solenoid valve connected to a vacuum breaker, as well as four solenoid air valves connected to the filter cartridge's reverse pulse cleaning circuit, and two solenoid air valves connected to the reinjection system's air lock valves. The electrical control panel can be equipped with: a vacuum pump gauge, vacuum differential gauges, a filter differential gauge, switches, start/stop push buttons, a cartridge filter cleaning pulse timer circuitry package, indicating lights, relays, and a timer/circuitry package for the reinjection system. The vacuum loader 10 can have a pneumatic circuit and valves for operation of vacuum breaker, reinjection system air lock valves, and reverse air-pulse circuit.

The vacuum pump engine or motor package can be equipped with a drive guard, base, engine or motor vacuum pump controls, gauges, exhaust silencer, starter switch, and throttle. The vacuum loader 10 can also have an engine or motor driven compressed air package to provide compressed air for reverse air-pulse filter cleaning and the air actuated valves.

The vacuum loader 10 can be mounted upon a towable, over the road, trailer-mounted frame, such as a 10,000 lb. load capacity over-the-road tandem axle trailer. The trailer can be equipped with hydraulic surge brakes, a break-away emergency brake system, emergency brakes, a lighting system, break-away chains, and jack stands. The trailer can be towed by a truck. The trailer can have a main frame made of carbon steel, stainless steel, anodized steel, or other metal. The trailer can have a tow bar which can extend longitudinally outwardly from an abutment plate or flange plate along the longitudinal centerline of the trailer assembly. The tow bar can have a drum ball tow coupler and tow hitch to enable the vacuum loader 10 to be pulled to the collection or storage site by a tow truck, mine vehicle or other suitable vehicle equipped with a mating tow bar, ball, or hitch. The vacuum loader 10 can also be carried by a mine vehicle. The tow bar can be connected to a top wind jack with an upper crank and lower base plate or foot. Other wind jacks can be connected to other portions of the trailer. Jacks are useful to level, stabilize, and balance the trailer and vacuum loader 10 on mine floors and other surfaces at the collection site during stationary vacuum operation of the vacuum loader 10. The underframe of the trailer assembly can includes a set of wheel assemblies positioned about the middle of the trailer. The wheel assemblies can comprise four wheels and can have oil lubricated hub and drums, electric brakes, and tandem axles. The trailer assembly can also have a hydraulic surge braking system and a fire extinguisher. A gas tank with a gas inlet tube can be mounted to the trailer assembly. A battery can be seated upon and secured to the trailer assembly. The gas tank and battery can be connected to a drive engine package mounted on the trailer assembly.

Operation

The vacuum loader 10 (FIG. 8) with the rotary bulk separator 12, tangential separator 14 (FIG. 1), filtering system 22, and the reinjection system 16 effectively, efficiently, and safely collect and discharge fibers, dust laden liquids, dry dusty materials, contaminated sand and soil, slivers, chips, granular material, pellets, chunks, powders, slurries, liquids, debris, coal and other minerals, soda ash, metals, dense and heavy material, such as steel shot and talconite pellets, hazardous matter, waste, and other particulate material. Additionally, the vacuum loader 10 provides a total vacuuming system which is under continuous negative pressure from the vacuuming hose inlet port to the vacuum producing pump inlet port during all vacuuming cycles throughout the operating day and shift.

The gross cut rotary bulk separator 12 (FIG. 8) grossly separates the particulate material from the influent air or other fluid into a particulate laden stream containing the bulk of the particulate material and a grossly separated fluid carryover dust having entrained residual particulate material. The gross cut rotary bulk separator 12 has a direct belt loader with an inlet connection 39 which communicates with the reinjection outlet hose 38 (FIG. 2) to receive influent dusty fluid from the inlet hose 24 and separated recycled particulate material from the tangential separator 14. The bulk material receiver 18 (FIG. 8) comprising a belt conveyor, bin or receiver positioned below the gross cut rotary bulk separator 12, receives the particulate laden stream from the gross cut rotary bulk separator 12 for transport to a collection and processing site in the mine.

Figure 8:
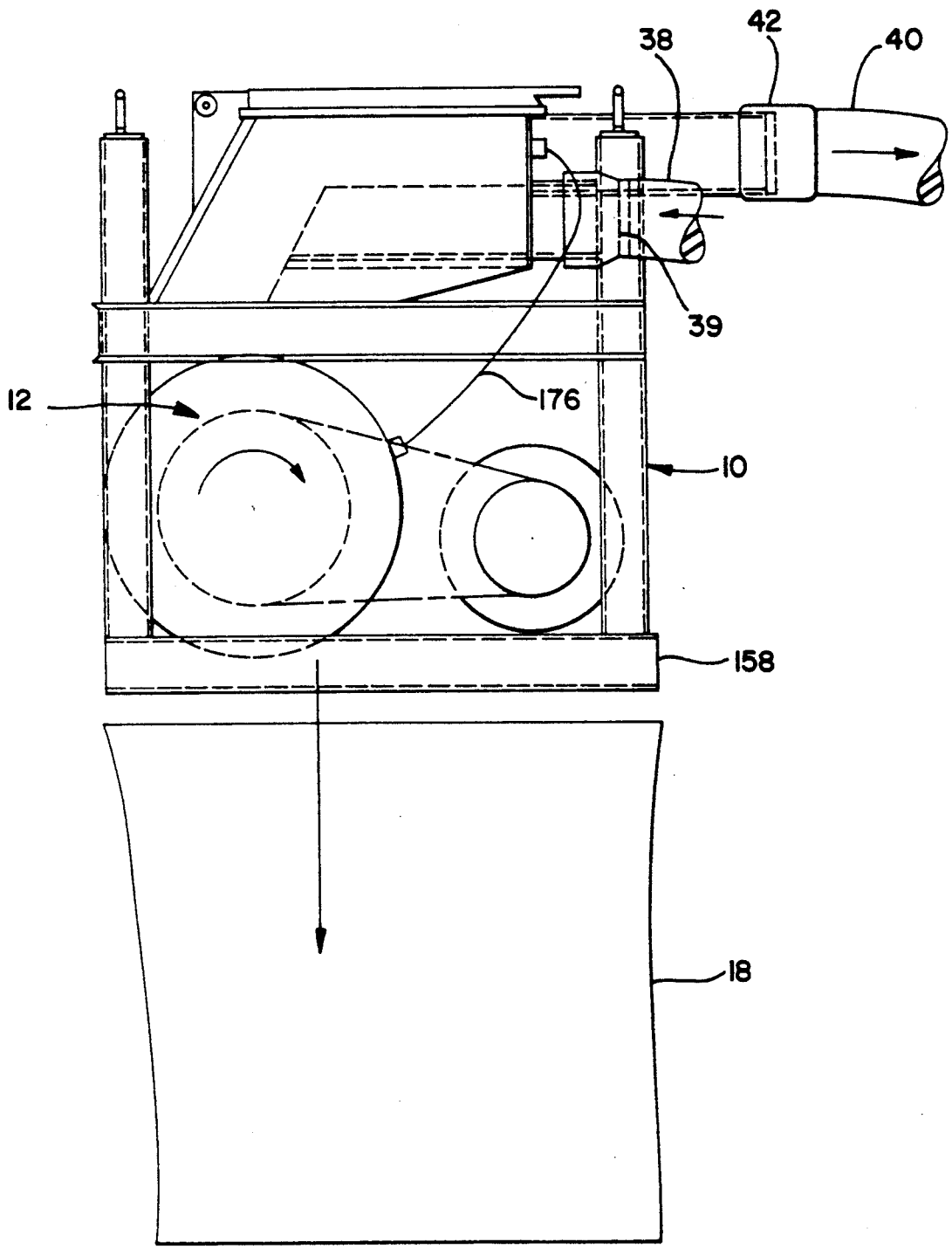
FIG. 8 is a side view of the first stage separation unit comprising a rotoceptor direct belt loader.

The partially dedusted air or other fluid is conveyed from the rotary bulk separator 12 (FIG. 8) of the first stage bulk separation unit to the separation unit 14 (FIG. 1) via a bulk separation discharge hose 40. The tangential entry cyclone separator 14 centrifugally separates most of the carryover dust from the bulk separated fluid for settlement and eventual flow through the air lock valves or airlock feeder 36 of the reinjection system positioned below the tangential cyclone separator 14. The removed and centrifugally separated filtered particles fall by gravity to the reinjection air lock system below for recycling and reinjection into the bulk separator 12 (FIG. 8). The cleaner, centrifugally cycloned air will be drawn (sucked) upwardly and be filtered by the high efficiency cartridge filters 116–119 (FIGS. 1 and 3) which will filter the particulates down to under 1 micron, preferably at an efficiency of about 99.5% at about 0.33 microns. Collected dust on the surface of the filters 116–119 can be reverse air-pulse cleaned by variable pulse speed, air pulse injectors 120–123 for discharge through the air lock valves of the reinjection system into a vacuuming recycle line 38 (FIG. 2) for redepositing (reinjection) and recycling into the bulk separator 12 (FIG. 81) of the first stage bulk separation unit.

The vacuum loader 10 (FIG. 1) incorporates a unique two stage separator system 1 and 22 which provides for highly effective separation of the vacuumed product (wet, dry, or fibrous, as well as liquids and slurries) thereby providing customers with versatile, effective, and substantially trouble-free vacuum cleaning and loading. The vacuum loader 10 provides capabilities for long distance vacuuming of very light fibrous materials, such as fiberglass to lumps, chunks, soda ash, steel shot and talconite pellets. The vacuum loader 10 with reinjection system 30 and Rotaceptor rotary bulk separator 12 (FIG. 8) is a unique direct conveyor belt loader for low overhead clearance applications.

Dusty material can be vacuumed from the material spill pile at the vacuuming work area via an inlet hose 24 (FIG. 2) and a five inch or six inch diameter reinjection tee 32 where separated carryover dust from the rotary bulk separator 12 (FIG. 8) is reinjected back into the vacuuming line. The vacuumed material can then flow through the six inch diameter hose 38 connecting the reinjection tee to the six inch diameter inlet connection 39 of the rotary bulk separator 12 with direct belt loader. The rotary bulk separator 12 separates out and discharges the bulk of the vacuumed material to the bulk material receiver 18 comprising a belt conveyor, bin or receptacle (receiver). Any carryover dust can be air conveyed via a six inch diameter vacuum hose 40 connecting the rotary bulk separator's six inch outlet port 42 to a six inch diameter tangential inlet port 62 (FIG. 2). Any carryover dust will enter the tangential separator 14 for separation and filtration by the cartridge filtration system 22 above. The separated and filtered dust will be deposited into and through the reinjection system's air-lock feeder 36 to the reinjection tee 32 below thereby transporting any carryover dust back to the rotary bulk separator 12 (FIG. 8) for deposit onto the bulk material receiver 18 comprising a belt conveyor, bin or receiver below. The filtered air will flow to the vacuum pump 130 (FIGS. 1 and 2) and then discharges through the muffler 140 with silencer base 142 and into the atmosphere via a vent pipe 154.

The reinjection system's air-lock feeder 36 (FIG. 2) and reinjection tee 32 provides for the return of any carryover dust back to the bulk discharge rotary bulk separator 12 (FIG. 8). It is important to stand away from the rotary bulk separator 12 and reinjection system's air lock feeder 36 (FIG. 2) when it is powered for running and not put hands or any parts into inlet or discharge openings of the rotaceptor's rotary air lock feeder 36, as well as to be careful near its shear blades.

The rotary bulk separator 12 (FIG. 8) with direct belt loader serves to discharge the bulk of the vacuumed material onto the bulk material receiver 18 comprising a belt conveyor, bin or receiver below. The rotary bulk separator 12 incorporates two forklift line channels 158 for discharge of the vacuumed material onto the bulk material receiver 18. The rotary bulk separator 12 also incorporates a two inch diameter prevent circuit 176 comprising an air pressure equalizing circuit to equalize the air pressure in each of the vane pockets prior to charging it with the vacuumed material.

The second stage separation unit 14 (FIG. 2) of the vacuum loader 75 HP power unit incorporates a two stage separator system which provides for separation of the vacuumed product by: (a) the second stage tangential entry cyclone separator 14 with directional vanes 70 and (b) the third stage cartridge filtration system 22 for final filtration of the carryover dust to 99.97% of 0.33 microns.

The vacuum loader power unit can comprise two units which can be separated and transported separately by a facility 10,000 lb. fork lift truck. The vacuum loader powerhead assembly 160 (FIGS. 1 and 2) can comprise:

1. cartridge filtration system 22.
2. positive displacement vacuum pump 130.
3. 75 HP electric motor pump drive 132 (FIG. 1).
4. silencer base muffler 140 with two forklift tine openings 162 and 164 (FIG. 2) for lifting the powerhead 160.
5. control panel.
6. pneumatic circuit sequence of operation function sequence.

The pneumatic circuit provides for the reverse airpulse circuit for compressed air cleaning of the cartridge filters 116-119 (FIG. 3). The pulse cycle is controlled by a solid state pulse timer located in the control panel. The pulse duration is also adjustable and is normally 15 seconds with a pulse interval of six seconds.

The powerhead support base assembly 166 comprises a:

1. Support base structure with two forklift tine openings 159 (FIG. 2) for a 10,000 pound forklift truck lifting of the entire unit (powerhead 160 and support base assembly 166) or the support base assembly 166 only.
2. Tangential separator 14.
3. Reinjection airlock feeder 36.
4. Air compressor.
5. Powerhead mounting guides and pins for guidance and maintaining of the powerhead 160 on the support base structure by a 10,000 pound facility forklift truck.

The procedure for setup and assembly can be as follows:

1. Position the rotary bulk separator 12 (FIG. 8) over the bulk material receiver 18 comprising a mine belt conveyor, bin or receiver by inserting 5500 pound forklift truck tines into the two tine channel openings 158 located at the lowest portion of the rotary bulk separator's bail, and securely suspend it in place from the mine ceiling with the four eyes located on the bail; or hold the rotary bulk separator 12 in place over the mine belt 18 with a 5,500 pound facility forklift truck.

2. Position the vacuum power package assembly comprising the powerhead 160 (FIG. 2) and support base 168 within view of the rotary bulk separator 12 (FIG. 8) and preferably not more than 50 feet away. Use a forklift truck, such as a 10,000 pound forklift truck, to move and position the assembly by lifting and moving by engaging the fork tines into the support base's lower fork tine channels 170 and 172 (FIG. 2) located at floor elevation.

3. Twist lock into place the following 460V/3Ph/60Hz male twist lock safety plugs into 460V/3Ph/60Hz control panel female sockets located on the vacuum loader powerhead 160: (a) The rotary bulk separator 12 460V/3Ph/60Hz electric motor cord with twist lock connector; (b) The reinjection system's air-lock feeder 36, 460V/3Ph/60Hz, electric motor cord with twist-lock connector; and (c) The air compressor 174, 7½ HP 460V/3Ph/60Hz electric motor cord with twist lock connector.

4. Connect the quick disconnect compressed air supply's wire wrapped pressure line from the 7½ HP air compressor 174 (FIG. 2) to the male connection fitting located on the powerhead 160 at the pressure regulator.

5. Position the selector switches located on the powerhead 160's control panel to the automatic positions as follows: (a) The rotary bulk separator selector switch to auto position; and (b) The reinjection system's air-lock feeder 36 (FIG. 2) to auto position. The selector switch's auto position will automatically start the respective rotary bulk separator 12 (FIG. 8) and the reinjection system's air-lock feeder 36 (FIG. 2) when the vacuum pump start push button is depressed.

6. The operator should now connect the vacuuming hoses 24, 38 and 40 (FIG. 2).

7. Position the vacuuming nozzle 26 (FIG. 2) at the material pile to be vacuumed. The nozzle 26 should not be placed into the material pile until after the vacuum loader pump 130 (FIG. 1) is running and all support equipment is running, including: (a) The rotary bulk separator 12, electric motor 460V/3Ph/60Hz. (b) The reinjection system's air-lock feeder 36, electric motor—460V/3Ph/60Hz; and (c) The air compressor 174 (FIG. 2) electric motor 460V/3Ph/60Hz.

8. Plug the plug of the electrical cord into an ample 460V/3Ph/60Hz electric power socket per local and national electrical safety codes.

9. Unlock and push the safety disconnect up to the on position. 460V/3Ph/60Hz power to the control circuit.

10. Pull out the main emergency stop mushroom button which will provide 115V/1Ph/60Hz power to the control circuit.

10. Push the vacuum pump's 130 START push button on the vacuum loader 10 control panel, or throw the RUN switch on radio controlled remote starter, or push the START push button on the remote start/stop with cord and twist lock connector connected the 115V socket in control panel.

12. Pushing the vacuuming pump 130 (FIG. 2) START push button will initiate the following functions: (The vacuum pump 130 will not start at this time until the compressed air pressure is above the compressed air pressure switch set point.)

a. The 460V/3Ph-/60Hz compressor 174 will start.
b. The 460V/3Ph/60Hz rotary bulk separator 12 (FIG. 8) drive will start. The ON/OFF auto,3- position selector switch should be in the AUTO position for the rotary bulk separator 12.
c. The 460V/3Ph/60Hz reinjection system's air-lock feeder 36 (FIG. 2) will start. The 2-position ON-AUTO selector switch should be in the AUTO position for automatic starting of the reinjection system's air-lock feeder 36.
d. Start the second stage cartridge filter reverse air-pulse cleaning circuit.

13. The operator can now commence to vacuum the product.

The preferred vacuuming procedure includes: Vacuum load the vacuuming hose with material for vacuum readings of under 14 inch mercury on the gauge. This will assure that the vacuum pump 130's vacuum breaker does not open and bypass air. Bypassing air at the vacuum pump 130 will greatly affect vacuuming capacity. If the pump 130 vacuum breaker audibily pops, back off on the vacuuming rate by adjusting the air bypass sleeve located on the vacuuming nozzle 26. Increasing orifice hole openings will bypass more air at the nozzle 26 thus reducing material pick up rate from the pile. Decreasing orifice hole openings will decrease air bypass at the vacuuming nozzle 26 and increase material pickup rate from the pile.

It is recommended to use a vacuuming nozzle 26 when vacuuming material. Not using a nozzle 26 can overload the vacuuming hose 24 thereby causing the vacuum relief valve to pop, which will result in possible plugging of material in the hose. Air or fluid flow is necessary to convey the product.

When material starts to move extremely slow at the vacuuming nozzle 26 and stoppages occur at the nozzle 26 pickup, pull the nozzle 26 out of the material to allow the material in the vacuuming hose 24 to clear out.

If the flow of material into vacuuming nozzle 26 decreases substantially for no apparent reason, there may be a lump or object (wire, etc.) wedged in the nozzle 26 or hose 24. The lump normally can be detected visually through the transparent hose wall or by lifting the hose along the run to determine where the higher weight is located. To unplug a section of hose, unclamp the section and turn the hose end to end for a reverse air flow.

If a high differential on the cartridge filter is observed over 20 inch water, then run the vacuum loader 10 and its components and do not vacuum product. This will allow the cartridge filters 116–119 (FIG. 3) to pulse-down and the tangential separator 14 below it to clear any accumulation of material in the tangential separator 14 to the rotary bulk separator 12 (FIG. 8) for discharge.

If the cartridge filter differential exceeds a preset limit, such as 30 inch water, the vacuum loader 10 will automatically shut down. At this occurance, manually push the start vacuuming push button to initiate another automatic pulse-down of the cartridge filters 116–119 (FIG. 3) with no air-flow of the vacuum pump 130.

If the cartridge filter differential again climbs to the limit, such as 30 inch water differential, the tangential separator 14 needs to be cleared of excess material and any debris. Access the tangential separator 14 through the two filter housing access doors and move the accumulated material to the reinjection feeder's inlet port by means of a push rod. Also remove any foreign debris. The vacuuming system must not be operating during this period and the main disconnect must be down in the Off position.

The operator will continue to vacuum material until finished, at which time he will push STOP VACUUMING bottom which will immediately stop the: (a) vacuum pump 130; (b) rotary bulk separator 12 inch, reinjection system's feeder; (c) compressor 174: (d) reverse air-pulse cartridge filter cleaning system.

For safety precautions, prior to transporting the rotary bulk separator 12 to a new location by a facility 5500 pound forklift truck, the operator should:
a. Throw the main (460V/3Ph/60Hz) disconnect located on the control panel down to the OFF position, which will cut off all electrical power in the control panel except for the (460V/3Ph/60Hz) power feed to the main disconnect.
b. Push the main (115V/1Ph/60Hz) power button on the control panel of the position.
c. Disconnect the power cord from the power supply disconnect.
d. Disconnect the rotary valve's twist-lock cord connector from the control panel and securely wind it onto the cord retainer brackets provided on the interceptor support frame.

In order to move, dismantle or disassemble the vacuum loader 10, the powerhead 160 (FIGS. 1 and 2) assembly can be separated from the support base assembly by a 10,000 pound forklift truck. Thereafter, disconnect the quick connect compressed air line form the pressure regulator connector located on the powerhead 160. Disconnect the three (3) twist-lock (460V/3Ph/60Hz) cord connectors from the control panel located at the rear of the powerhead 160 which are serving the (460V/3Ph/60Hz) air compressor 174 and the (460V/3Ph/60Hz) reinjection system air-lock feeder 36 which are both mounted on the lower support base assembly. Also, disconnect the twist-lock cord connector from the control panel which is serving the (460V/3Ph/60Hz) rotary bulk separator 12 drive. If an overhead clearance problem exists, the powerhead 160 can be removed form the support base assembly below for transport by a 10,000 pound forklift truck to the new location. The powerhead 160 should be lifted for transport by a forklift truck by fully inserting the forklift tines into the two fork tine openings 162 and 164 (FIG. 2). The lower section support base assembly can be then lifted by the same 10,000 pound forklift truck and transported to the new location. The support base assembly 166 can be lifted at the two fork tine openings 158. The rotary bulk separator 12 (FIG. 8) can be lifted via its two fork tine openings 158 by the 10,000 pound forklift truck and transported to its new location.

EXAMPLE

A prototype model of a vacuum loader 10 was successfully tested in Wyoming. The directional vanes 70 (FIG. 4) were constructed of 7 gauge steel. The central vanes 72 and 74 and right vane 84 (baffle) were 11¾ inches high with the right vane 84 and right central vane 72 having an inclined inlet face end 94 with a 7 degree bevel. The left vane 86 (deflector) was 8 inches high and had an inclined inlet face end 90 with a 15 degree bevel. The inlet conduit 64 comprised a 6 inch diameter steel pipe and was over 1 foot long. Adjacent the inlet conduit 64 was a 10 inch long, 2 inch diameter steel pipe nipple toe 96 (FIG. 7) positioned at a 30 degree angle of inclination. The annular wall 52 of the tangential entry cyclone separator 14 had an inner surface 56 with a 1 foot 3 inch radius and an outer exterior surface 54 with a 1 foot 6¼ inch radius. The outlets 66 and 68 (FIGS. 4 and 7) comprised rectangular openings and were offset from the center of the cyclone separator 14. The tangential separator 14 was about one foot high. A 460V, 3PH, 60 HZ air compressor 174 (FIG. 1) was mounted along side the rotary bulk separator 12 (FIG. 8) comprising a 460V, 3PH, 60 HZ rotoceptor direct belt loader. A 460V, 3PH, 60HZ reinjection system with a 6 inch diameter reinjection tee 32 (FIG. 2) was used. A two inch air pressure circuit was connected to the airlock feeder 36. The vacuum loader 10 had upper and lower sections 160 and 166 with forklift tine openings 159, 162 and 164 which were transportable by a 10,000 pound forklift truck. The vacuum loader 10 had a total overall height of over 7 feet.

The preferred tangential separator 14 (FIG. 1 ) is very short with a height of about twice the diameter of the inlet hose 40, i.e. the ratio of the height of the tangential separator 14 to the diameter of the inlet hose 40 or cyclone inlet 62 is 2:1, e.g. a 12 inch high tangential separator is used with a 6 inch inlet hose. In contrast, conventional tangential cyclones with cones are relatively tall with a height of about ten time (10 fold) the diameter of the inlet hose. The vacuum loader 10 of the present invention preferably has a height ranging from 6.5 feet to 7.5 feet with a 2, 4 or 6 inch diameter inlet hose 40, and a tangential separator 14 height ranging from 4 inches to 12 inches.

Applicant's vacuum loader 10 equipped with the tangential entry cyclone separator with directional vanes produced unexpected surprisingly good results in removing, collecting, separating, and disposing soda ash, dust, fibers and other particulate material in mines over conventional vacuum cleaners (loaders).

Among the many advantages of the vacuum loader are:
1. Superior vacuuming in mines.
2. Excellent separation and removal of fibers and large particulates of dusty material.
3. Better solids-gas separation.
4. Improved collection of minerals, metals, and heavy particulates.
5. Prevention of dust explosions.
6. Enhanced air purification.
7. Greatly reduced operator worker exposure to dust.
8. Good load-carrying, collection capacity.
9. Greater efficiency of operation.
10. Excellent dedusting.
11. Cost effective.
12. Economical.
13. Easy to install, remove, and repair.
14. Simple to use.
15. Less maintenance.
16. Effective.
17. Efficient.
18. Dependable.
19. Safe.

Although an embodiment of the invention has been shown and described, it is to be understood that various modifications and substitutions, as well as rearrangements of parts and process steps, can be made by those skilled in the art without departing from the novel spirit and scope of this invention.

What is claimed is:

1. A vacuum loader for removing particulate material comprising a compact vaned and short tangential separator means for partially dedusting and separating a substantial amount of particulates from a fluid, said compact vaned and short tangential separator means having vane means for minimizing clogging and substantially enhancing separation of said particulates, said compact vaned and short tangential separator defining inlet means for receiving said fluid containing said particulates and outlet means including an upwardly facing fluid outlet port for discharge of said separated fluid and particulates and a lower particulate outlet, said vane means being arranged tangentially along a generally horizontal flow path with at least one elongated central vane extending continuously from said inlet means to said outlet means, said compact vaned and short tangential separator having a height ranging from about 4 inches to about 12 inches, and said inlet means having a diameter ranging from about 2 inches to about 6 inches.

2. A vacuum loader in accordance with claim 1 wherein the ratio of the height of said compact vaned and short tangential separator to the diameter of said inlet means is about 2:1, said compact vaned and short tangential separator has a substantially circular inner surface, and said vane means are positioned eccentrically to said circular inner surface.

3. A vacuum loader in accordance with claim 1 wherein said vane means comprise curved vanes and said curved vanes are spaced differently from each other.

4. A vacuum loader in accordance with claim 2 wherein said vane means includes a concave deflector which intersects and is connected to said circular inner surface.

5. A vacuum loader in accordance with claim 1 wherein at least one of said vane means has at least one beveled end to enhance particle separation.

6. A vacuum loader for removing particulate material, comprising:
vaned and substantially short tangential separator means for partially dedusting and separating a substantial amount of particulate material from a dusty fluid, said vaned and substantially short tangential separator means comprising
inlet means for ingress of a dusty fluid containing particulate material;
outlet means including a lower particulate outlet for egress of separated particulate material and an upwardly facing fluid outlet for egress of said partially dedusted fluid; and
directional vane means extending substantially continuous between said inlet means and said outlet means for changing direction of flow of said dusty fluid.

7. A vacuum loader in accordance with claim 6 wherein said vaned and short tangential separator includes a housing with an annular wall positioned about said outlet means and said directional vane means, and said directional vane means comprise differently space curved vanes with converging portions for narrowing the flow path of said dusty fluid, and said curved vanes being positioned eccentrically relative to said annular wall.

8. A vacuum loader in accordance with claim 7 wherein at least one of said curved vanes has a beveled end.

9. A vacuum loader in accordance with claim 7 wherein said curved vanes includes an eccentric concave deflector connected to said outlet means and said annular wall.

10. A vacuum loader for removing particulate material, comprising:

a vaned and short tangential entry cyclone separator for partially dedusting and separating a fluid laden with particulate material, said vaned and short tangential entry cyclone separator comprising a housing having an annular wall with a substantially circular exterior surface and a substantially circular inner surface surrounding an interior with a central portion;

an inlet comprising a tangential intake conduit extending linearly and tangentially outwardly from one of said circular surfaces of said annular wall of said housing and communicating with said interior of said housing;

outlet openings in said central portion including a lower particulate outlet comprising a downwardly facing outlet port for discharging separated particulate material by gravity flow substantially downwardly from said separator and an upper fluid outlet comprising an upwardly facing outlet port for exiting partially dedusted fluid substantially upwardly from said separator; and an array of directional vanes extending between said inlet and said outlet openings for changing the direction of flow of said fluid, said directional vanes including a pair of central vanes with substantially parallel portions, said central vanes being connected to and communicating with said inlet and said outlet openings, and said directional vanes including a concave deflector intersecting said circular inner surface of said annular wall and extending between and connecting said circular inner wall and said outlet openings.

11. A vacuum loader in accordance with claim 10 wherein said directional vanes have eccentric curved portions.

12. A vacuum loader in accordance with claim 11 wherein at least some of said directional vanes have a beveled inlet end facing said inlet.

13. A vacuum loader in accordance with claim 11 wherein the ratio of the height of said vaned and short tangential entry cyclone separator to the diameter of said tangential intake conduit is about 2:1.

14. A vacuum loader in accordance with claim 11 wherein said vaned and short tangential entry cyclone separator has a height ranging from about 4 inches to about 12 inches and said tangential intake conduit has a diameter ranging from about 2 inches to about 6 inches.

15. A vacuum loader for removing particulate material, comprising:

inlet hose means for drawing fluid laden with particulate material under a suction pressure;

reinjection means comprising a collection transition communicating with said inlet hose means for receiving said particulate laden fluid and for receiving separated particulate material;

first stage separator means comprising
rotary bulk separator means with direct belt loader means communicating with said reinjection means for receiving and making a gross cut separation of said particulate material from said fluid;
bulk material receiving means comprising a member selected from the group consisting of a conveyor, bin and receiver, for receiving the grossly separated particulate material from said rotary bulk separator means;

second stage separator means comprising
tangential separator means for partially dedusting and separating carryover dust comprising residual tangential separator means comprising a compact vaned and substantially short tangential entry cyclone separator with cyclone inlet means communicating with said rotary bulk separator means for ingress of said grossly separated fluid from said rotary bulk separator means, cyclone outlet means including a cyclone particulate outlet for egress of said carryover dust comprising said separated particulate material into said collection transition of said reinjection means and said cyclone outlet means including a cyclone fluid outlet for egress of partially dedusted fluid, and directional vane means comprising eccentric curved vanes extending substantially continuously from said inlet means to said outlet means for varying the direction of flow of said grossly separated fluid between said cyclone inlet means and said cyclone outlet means and for substantially reducing backup and clogging of said carryover dust in said tangential separator means; and filtering means communicating with said tangential separator means for filtering said partially dedusted fluid from said tangential separator means.

16. A vacuum loader in accordance with claim 15 wherein said directional vane means comprises at least one member selected from the group consisting of an arcuate baffle and a concave deflector.

17. A vacuum loader for removing particulate material, comprising:

a flexible inlet vacuuming hose having a bulk vacuuming nozzle for vacuuming an influent fluid containing particulate material from a material spill pile in a mine under substantially continuous negative pressure;

a reinjection unit having a reinjection tee for receiving influent dusty fluid and separated particulate material from a tangential separator, said reinjection unit having an upright airlock feeder extending upwardly and communicating with said tangential separator for feeding separated material from said tangential separator downwardly, and a flexible reinjection outlet hose for discharging said dusty fluid and particulate material;

a gross cut rotary bulk separator for grossly separating said particulate material from said fluid into a particulate laden stream containing the bulk of said particulate material and a grossly separated fluid containing carryover dust comprising entrained residual particulate material, said gross cut rotary bulk separator having a direct belt receiver loader with an inlet connection communicating with said reinjection outlet hose for receiving said dusty fluid and particulate material;

bulk material receiving means comprising a member selected from the group consisting of a belt conveyor, bin and receiver, positioned below said gross cut rotary bulk separator for receiving said particulate laden stream from said gross cut rotary bulk separator for transport to a collection and processing site in the mine;

a bulk separator-fluid-outlet hose connected to and communicating with said gross cut rotary bulk separator and said tangential separator for passing said grossly separated fluid stream from said gross cut rotary separator to said tangential separator;

said gross cut rotary bulk separator having a fluid outlet port communicating with said bulk separator-fluid-outlet hose for exiting said grossly separated fluid stream into said bulk separator-fluid-outlet hose, and said gross cut bulk separator having a bulk material outlet for discharging said particulate laden stream onto said receiving means;

a tangential entry cyclone comprising said tangential separator for partially dedusting and separating said carry over dust from said grossly separated fluid stream, said tangential entry cyclone comprising a cyclone housing having an annular wall with a substantially circular exterior surface and a substantially circular inner surface surrounding a cyclone interior with a central cyclone portion;

a cyclone inlet connected to and communicating with said bulk separator-fluid-outlet hose for receiving said grossly separated fluid stream and carryover dust from said bulk separator-fluid-outlet hose, said cyclone inlet comprising a tangential intake conduit extending linearly and tangentially outwardly from one of said circular surfaces of said annular wall of said cyclone housing and communicating with said cyclone interior;

cyclone outlet openings in said central cyclone portion including a lower particulate cyclone outlet comprising a downwardly facing cyclone outlet port for discharging said separated carry over dust comprising said separated particulate material downwardly from said tangential entry cyclone into said airlock feeder and said cyclone outlet openings including an upper fluid cyclone outlet port for passing and exiting partially dedusted fluid substantially upwardly from said tangential entry cyclone, said cyclone outlet openings being covered by a top closure plate; and a set of directional vanes extending between said cyclone inlet and said cyclone outlet openings for changing the direction of flow of said fluid stream, said directional vanes including a pair of central vanes with substantially parallel portions, said central vanes being connected to and communicating with said cyclone outlet openings;

said airlock feeder extending downwardly from and communicating with said tangential entry cyclone and having at least one control valve, said valve being open to permit passage of said separated particulate material removed from said tangential entry cyclone into said collection chamber, and said valve being closable to maintain an air lock and substantially block and prevent passage of said separated particulate material removed from said tangential entry cyclone into said collection chamber;

a filtering unit positioned above and communicating with said tangential entry cyclone, said filtering unit having a filtration chamber with a set of canisters containing tubular filters spaced along side each other for filtering said partially dedusted fluid;

a vacuum pump communicating with said filtering unit and said hoses for drawing fluid through said filtering unit and said hoses, said vacuum pump comprising at least one member selected from the group consisting of a compressor, pneumatic pump, air blow, fan, and turbine; and a muffler assembly providing a sound abatement control unit in the mine for quieting filtered fluid exiting said filtering unit and for helping suppressing operational noises from said vacuum pump, said muffler assembly having a silencer base comprising a support housing positioned in proximity to said filtering unit and said vacuum pump, an internal composite sound attenuating chamber with a channel communicating with said filtering unit for varying the direction of flow of said filtered fluid, and acoustical baffles in said channels covered with sound insulating material for dampening the noise of said filtered fluid passing through said channel.

18. A vacuum loader in accordance with claim 17 wherein said directional vanes have curved eccentric portions spaced unevenly from each other.

19. A vacuum loader in accordance with claim 17 wherein said directional vanes include a concave deflector spaced outwardly of said central vanes, said concave deflector having an outlet end connected to said outlet openings and an inlet end connected to said inner surface of said annular wall of said housing.

20. A vacuum loader in accordance with claim 17 wherein said tangential entry cyclone has a height of about twice the diameter of the bulk separator-fluid-outlet hose.

21. A vacuum loader in accordance with claim 17 wherein the ratio of the height of said tangential entry cyclone to the diameter of said cyclone inlet is about 2:1.

22. A vacuum loader in accordance with claim 17 having an overall height ranging from about 6.5 feet to about 7.5 feet.

23. A vacuum loader in accordance with claim 22 wherein said tangential entry cyclone has a height ranging from about 4 inches to about 12 inches and the diameter of said cyclone inlet ranges from about 2 inches to about 6 inches.

* * * * *